United States Patent Office  3,264,308
Patented August 2, 1966

3,264,308
DIHYDRODIBENZOCYCLOHEPTENE
CARBOXYLIC ACID ESTERS
Cornelis van der Stelt, Haarlem, Netherlands, assignor to
N.V. Koninklijke Pharmaceutische Fabrieken v/h
Brocades Stheeman en Pharmacia, Amsterdam, Netherlands, a corporation of Dutch law
No Drawing. Filed June 24, 1964, Ser. No. 377,520
Claims priority, application Great Britain, Apr. 27, 1961,
15,355/61
7 Claims. (Cl. 260—292)

This application is a continuation-in-part of application Serial No. 188,561, filed April 18, 1962, now abandoned.

This invention relates to new esters of 10,11-dihydrodibenzocycloheptene-5-carboxylic acids with basically substituted aliphatic and heterocyclic nitrogen containing alcohols and their salts having valuable therapeutic properties and to processes for the preparation thereof.

The therapeutically active compounds of this invention include esters of dihydrodibenzocycloheptene carboxylic acids of the general Formula I

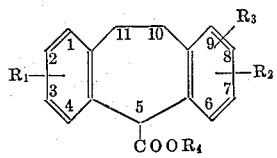

wherein $R_1$, $R_2$ and $R_3$ are the same or different and represent hydrogen, halogen or lower alkyl and $R_4$ is selected from the group consisting of di(lower alkyl) amino (lower alkyl), 1-(lower alkyl)-2,3- and 4-piperidyl, 1-(lower alkyl)-2- and 3-pyrroilidyl, tropinyl and pseudotropinyl.

The term "lower alkyl" as employed herein, includes both straight and branched chain radicals of less than 7 carbon atoms.

The particularly perferred compounds are those wherein $R_1$ is in the 3-position and represents hydrogen, chloro or methyl, $R_2$ and $R_3$ are hydrogen and $R_4$ represents a tropinyl group or a γ-diethylaminopropyl group.

As to the salts, those coming within the purview of this invention include the acid-addition salts, particularly the non-toxic acid-addition salts.

Acids useful for preparing the acid-addition salts include, inter alia inorganic acids, such as the hydrohalic acids (e.g. hydrochloric and hydrobromic acid), sulfuric acid and phosphoric acid, and organic carboxylic acids such as oxalic, maleic, fumaric, tartaric, citric, acetic, succinic, lactic and pamoic acid.

The compounds of this invention are therapeutically active compounds which are utilizable as anti-arrhythmia agents in view of their ability to successfully combat spontaneous and electrically-induced cardiac arrhythmia in animals and men. Their effect is of longer duration than that of known medicines such as quinidine and procaine amide and is not offset by undesired side effects such as influence on blood pressure as are seen with quinidine and procaine amide in some instances. Moreover the new compounds and their salts show anticholinergic, spasmolytic and analgesic activity. In view of their pharmacological activity either the free basic esters or non-toxic acid-addition salt thereof may be administered orally or parenterally in conventional dosage forms such as tablets, capsules, injectables or the like by incorporating the appropriate dose of the compound with carriers according to accepted pharmaceutical practice.

The compounds of this invention can be prepared by the following methods. In accordance with one method of this invention a 10,11-dihydro-5H-dibenzo[a,d]cyclohepten-5-ol of the general Formula II:

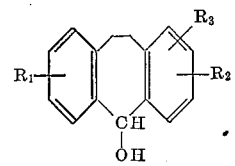

wherein $R_1$, $R_2$ and $R_3$ are as hereinbefore defined is employed as the starting material.

In those instances where the starting alcohol is new, it can be prepared by interacting a phthalic anhydride with a phenylacetic acid to yield a benzalphthalide derivative which in turn is reacted with phosphorus and hydroiodic acid to yield the corresponding dibenzyl-o-carbonic acid. The resulting carbonic acid derivative is then cyclized either by condensation under treatment with phosphorus pentoxide at an elevated temperature or by first converting the carboxylic acid into the corresponding acid halogenide followed by cyclization of the latter under the influence of aluminum chloride. The ketone is thereupon reduced employing either compounds such as sodium borohydride, lithium aluminum hydride or sodium amalgamate as a reducing agent. This series of reactions is shown by the following equations wherein $R_1$, $R_2$ and $R_3$ are as hereinabove defined.

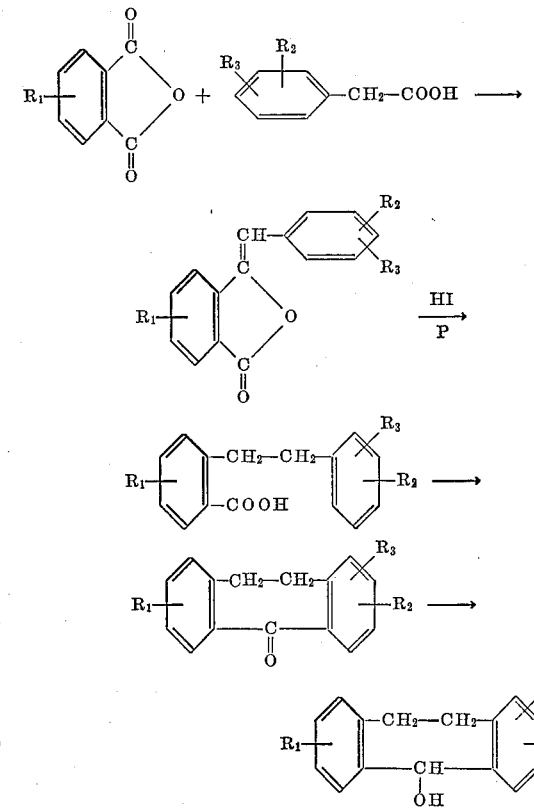

The preparation of the compounds of the general Formula II is more specifically dealt with in my copending application Serial No. 188,560, filed April 18, 1962.

To prepare the compounds of this invention, the alcohols of the general Formula II are first converted into the corresponding halogenides [compounds also disclosed in said application Serial No. 188,560] which are then converted into nitrile derivatives (compounds III); by treatment with a metal cyanide such as cuprous cyanide. The resulting cyano compound is then saponified to yield the carboxylic acid intermediate (compounds IV). Compound IV is then interacted with an alcohol of the formula R₄OH wherein R₄ is as hereinbefore defined to yield the final compound of Formula I.

This series of reactions is shown by the following equations wherein $R_1$, $R_2$, $R_3$ and $R_4$ are as hereinbefore defined and X represents a halogen atom, preferably a chlorine atom.

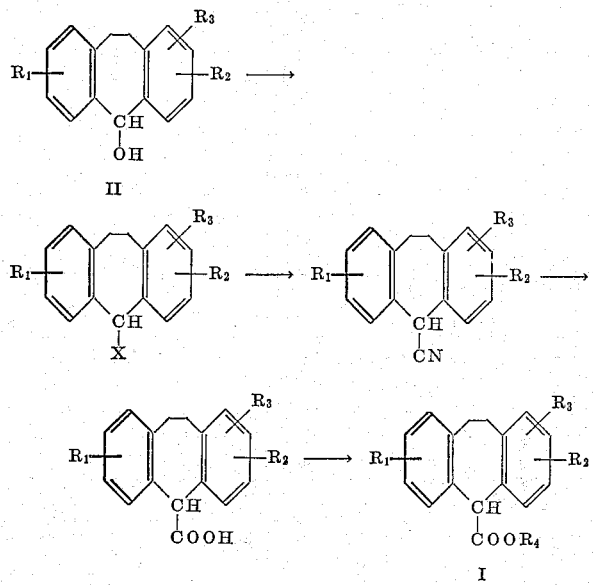

Another route to the compounds of the invention consists of a different method to prepare the intermediate carboxylic acids from the alcohols of Formula II. According to said method the alcohols are first converted into the methyl ethers which are then reacted with a sodium-potassium alloy. The potassium compound thus obtained is reacted with carbon dioxide yielding the desired acid. This series of reactions is shown by the following equations wherein $R_1$, $R_2$, $R_3$ and $R_4$ are as herein above defined.

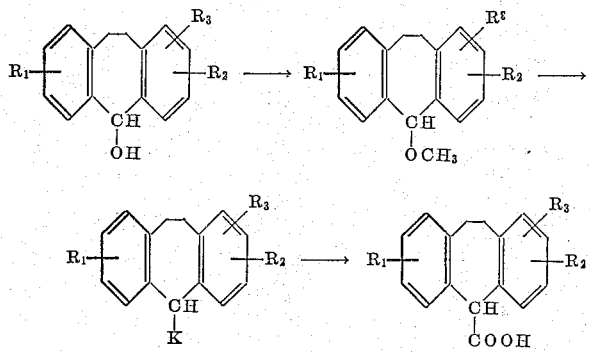

The following examples illustrate the invention (all temperatures being in centigrade). The first four examples are directed to the preparation of intermediates and the remaining examples are directed to the preparation of the final compounds of this invention.

EXAMPLE 1

*5-methoxy-10,11-dihydro-5H-dibenzo[a,d]cycloheptene*

To a boiling solution of 21 grams of 10,11-dihydro-5H-dibenzo[a,d]cyclohepten-5-ol in 105 ml. of methanol, 6 drops of concentrated hydrochloric acid are added. The resulting solution is then boiled under reflux for 3 hours whereupon the methanol is distilled off, leaving a residue of crude 5-methoxy-10,11-dihydro-5H-dibenzo[a,d]cyclo- heptene. The oil is purified by distillation under reduced pressure.

Yield 21.5 grams (96%). Boiling point 138–140°/0.001 mm.

EXAMPLE 2

*(10,11-dihydro-5H-dibenzo[a,d]cyclohepten - 5 - yl)carboxylic acid*

A sodium-potassium alloy is prepared by heating 9.6 grams of potassium and 2.4 grams of sodium in 110 ml. of dry xylene. The mixture is cooled and most of the xylene is decanted from the liquid alloy. The alloy is then washed thrice with anhydrous ether. The air in the reaction vessel is then replaced by nitrogen and 21.5 grams of 5-methoxy - 10,11 - dihydro-5H-dibenzo[a,d]cycloheptene is added. The mixture is stirred vigorously for one hour. A yellow color develops which quickly changes via a deep blue shade into olive green. The mixture is then heated on a steam bath for 20 hours under stirring. Gradually a brown solid precipitates. A sufficient amount of dry, solid carbon dioxide is added followed by 60 ml. of alcohol and 200 ml. of water. Two clear layers are formed which are separated. The ethereal layer is washed with 60 ml. of 2 N potassium hydroxide and the combined water layers are acidified with 5 N hydrochloric acid. The precipitated solid is filtered and dried to yield 9 grams (39%) of product, melting at about 206–208° (decomposition). Recrystallization from aqueous ethanol gives the pure product, constant melting at about 208°. The acid can also be purified by crystallization of the potassium salt from benzene.

From the ethereal solution 6 grams of 10,11-dihydro-5H-dibenzo[a,d]cycloheptene can be obtained by drying the solution over sodium sulfate and evaporation of the solvent.

Recrystallization from pure gasoline yields the pure substance melting at 74.4–75.5°. The structure is confirmed by infrared analysis.

EXAMPLE 3

*(10,11-dihydro-5H-dibenzo[a,d]cyclohepten-5-yl) cyanide*

28 grams of 5-chloro-10,11-dihydro-5H-dibenzo[a,d]cycloheptene is mixed with 11.7 grams of cuprous cyanide. The temperature is slowly raised to 180°. At about this temperature the reaction starts. The temperature is allowed to rise to about 210° and is kept at about that range for 15 minutes. The mixture is then cooled and a separation between organic and inorganic reaction products is brought about by addition of benzene.

The undissolved products of inorganic nature are filtered off and washed with ether. The organic layers are combined and concentrated by distillation of the solvents. The residue is made crystalline by addition of petroleum ether (boiling range 80–100°). The solid which crystallizes is filtered to yield about 19 grams of product. Recrystallization from petroleum ether gives 18 grams (68%) of the pure product constant melting at 88–90°.

*Analysis.*—Calcd. for $C_{16}H_{13}N$: C, 87.62%; H, 5.97%; N, 6.39%. Found: C, 86.95%; H, 6.03%; N, 6.80%.

EXAMPLE 4

*(10,11-dihydro-5H-dibenzo[a,d]cyclohepten-5-yl)carboxylic acid*

A mixture of 5.5 grams of 10,11-dihydro-5H-dibenzo[a,d]cyclohepten-5-yl cyanide, 2.4 grams of potassium hydroxide, 1.5 ml. of water and 6 ml. of ethanol is heated under reflux till evolution of ammonia from the reaction mixture can no longer be observed. The ethanol is then removed by distillation and water added so as to dissolve the greater part of the residue. Some insoluble material (amide with melting point 175–178°) is separated from the solution by filtration. After acidification of the filtrate by addition of aqueous hydrochloric acid the acid precipitates. After recrystallization from aqueous ethanol a yield of 60% is obtained. The melting point is 197–200°.

In a similar manner, by following the procedures of Examples 3 and 4, but substituting the following chlorides for the 5-chloro-10,11-dihydro-5H-dibenzo[a,d]cycloheptene, the indicated (10,11-dihydro-5H-dibenzo[a,d]cyclohepten-5-yl)carboxylic acid is formed, via the corresponding (10,11-dihydro-5H-dibenzo[a,d]cyclohepten-5-yl)cyanides:

| Reactant | Product |
| --- | --- |
| Y-substituted 5-chloro-10,11-dihydro-5H-dibenzo-[a,d]cycloheptene | Y-substituted(10,11-dihydro-5H-dibenzo[a,d]cyclohepten-5-yl)-carboxylic acid |
| Y is— | Y is— |
| 1-chloro | 1-chloro |
| 4-chloro | 4-chloro |
| 3-chloro | 3-chloro |
| 3-methyl | 3-methyl |
| 2-methyl | 2-methyl |
| 2,4-dimethyl | 2-4,dimethyl |
| 3-tert. butyl | 3-tert. butyl |

EXAMPLE 5

*Tropine ester of (10,11-dihydro-5H-dibenzo[a,d]cyclohepten-5yl)carboxylic acid, salt with hydrochloric acid*

(a) *Preparation of the acid chloride of (10,11-dihydro-5H-dibenzo[a,d]cyclohepten-5-yl)carboxylic acid.*—A mixture of 25 grams of (10,11-dihydro-5H-dibenzo[a,d]cyclohepten-5-yl)carboxylic acid, 14.9 grams of thionyl chloride and 120 ml. of dry benzene is heated under reflux for three hours. The benzene and the excess of thionyl chloride are then removed by distillation. The residue, consisting of 26 grams of solid acid chloride, is purified by crystallization from ligroin (boiling range 60–80°).

(b) *Preparation of the tropine ester.*—26 grams of the crude acid chloride obtained in step (a) is dissolved in 120 ml. of dry benzene. To this solution are then added 28.2 grams of tropine dissolved in 100 ml. of dry benzene. The mixture is heated under reflux for three hours. The reaction mixture is allowed to cool and the solid hydrochloric acid salt of tropine is removed by filtration. The filtrate is washed with water and dried over sodium sulfate. The solvent is then removed by distillation leaving a residue of crude tropine ester of (10,11-dihydro-5H-dibenzo[a,d]cyclohepten-5-yl)carboxylic acid.

(c) *Preparation of the hydrochloric acid salt.*—The residue obtained in step (b) is dissolved in dry ether. Upon addition of an ethereal solution of hydrochloric acid, the hydrochloride is precipitated. The crude salt is purified by crystallization from a mixture of ethanol and ether. Yield (calculated on the acid) 26 grams (65%). Melting point 266–268°.

*Analysis.*—Calculated for $C_{24}H_{28}ClNO_2$: C, 72.4%; H, 7.09%; N, 3.53%. Found: C, 72.3%; H, 7.6%; N, 3.3%.

EXAMPLE 6

*2-dimethylaminoethanol ester of (10,11-dihydro-5H-dibenzo-[a,d]cyclohepten-5-yl)carboxylic acid*

To a solution of 6 grams of the acid chloride obtained in step (a) of Example 5 in benzene is added 4.5 grams of dimethylaminoethanol dissolved in 15 ml. of benzene. The reaction mixture is heated under reflux for three hours. The mixture is then cooled and washed with water and dried over sodium sulfate. The benzene is then removed by distillation and the residue dissolved in dry ether. On addition of a solution of hydrogen chloride in ether the hydrochloric acid salt precipitates and is filtered off. It is purified by crystallization from a mixture of ether and ethanol. Yield 6½ grams (76%). Melting point 201–202°.

*Analysis.*—Calculated for $C_{20}H_{24}ClNO_2$: C, 69.44%; H, 6.99%; N, 4.05%. Found: C, 68.58%; H, 7.00%; N, 4.05%.

Purity of the compound as determined by titration: 99.4%.

EXAMPLE 7

*1-methylpiperidin-4-ol ester of 10,11-dihydro-5H-dibenzo-[a,d]cyclohepten-5-yl carboxylic acid, salt with maleic acid*

Following the procedure of Example 5 but substituting 24.9 g. of 1-methylpiperidin-4-ol for the tropine in step (b), the 1-methylpiperidin-4-ol ester of 10,11-dihydro-5H-dibenzo[a,d]cyclohepten-5-yl carboxylic acid is obtained in 72% yield. The maleate of the basic ester melts at 161.5 to 162.5°.

*Analysis.*—Calculated for $C_{26}H_{29}O_6N$: C, 69.16%; H, 6.48%; N, 3.10%. Found: C, 69.39%; H, 6.51%; N, 3.18%.

EXAMPLE 8

*3-diethylaminopropanol ester of 10,11-dihydro-5H-dibenzo[a,d]cyclohepten-5-yl carboxylic acid, salt with hydrochloric acid*

Following the procedure of Example 5 but substituting 28.8 g. of 3-diethylaminopropanol for the tropine in step (b), the 3-diethylaminopropanol ester of 10,11-dihydro-5H-dibenzo[a,d]cyclohepten-5-yl carboxylic acid is obtained in 55% yield. The hydrochloride of the basic ester melts at 144.5 to 146.5°.

*Analysis.*—Calculated for $C_{23}H_{30}O_2NCl$: C, 71.21%; H, 7.79%; N, 3.61%. Found: C, 71.32%; H, 7.83%; N, 3.79%.

EXAMPLE 9

*1 - methylpyrrolidin - 3 - ol ester of 10,11 - dihydro - 5H-dibenzo-[a,d]cyclohepten-5-yl carboxylic acid, salt with maleic acid*

Following the procedure of Example 5 but substituting 22.2 g. of 1-methylpyrrolidin-3-ol for the tropine in step (b), the 1-methylpyrrolidin-3-yl ester of 10,11-dihydro-5H-dibenzo[a,d]cyclohepten-5-yl carboxylic acid is obtained in 63% yield. The maleate of the basic ester melts at 143–145°.

*Analysis.*—Calculated for $C_{25}H_{27}O_6N$: C, 68.65%; H, 6.22%; N, 3.21%. Found: C, 69.06%; H, 6.20%; N, 3.14%.

EXAMPLE 10

*2-dimethylamino-1-methylethanol ester of 10,11-dihydro-5H-dibenzo-[a,d]cyclohepten-5-yl carboxylic acid, salt with oxalic acid*

To a suspension of 1.5 g. of sodium in 350 ml. of anhydrous toluene, 14.5 g. of 10,11-dihydro-5H-dibenzo[a,d]cyclohepten-5-yl carboxylic acid are added. The mixture is heated at a temperature of 80° until the sodium has completely disappeared. 7.2 g. of 2-dimethylamino-1-methylethylchloride is then added drop-wise and the mixture is refluxed for a period of 2½ hours. After cooling, sodium chloride is filtered off. The filtrate is washed with water, the aqueous layer is separated from the organic layer and the latter is dried with calcium chloride. After filtration the solvent is removed by distillation. The residue is dissolved in ether and a solution of oxalic acid in ether is added. The precipitated oxalate of the 2-dimethyl-amino-1-methylethanol ester of 10,11-dihydro-5H-dibenzo[a,d]cyclohepten-5-yl carboxylic acid is recrystallized from a mixture of ethanol and water. Its melting point is 211–213°. Yield 21 g. (84%).

The invention includes within its scope pharmaceutical preparations comprising one or more of the therapeutically active compounds of the invention in association with a pharmacologically acceptable carrier.

What is claimed is:

1. A compound selected from the group consisting of esters of the formula

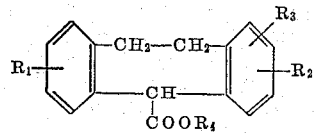

wherein $R_1$, $R_2$ and $R_3$ are each selected from the group consisting of hydrogen, halogen and lower alkyl, $R_4$ is selected from the group consisting of di(lower alkyl) amino (lower alkyl), 1-(lower alkyl)-2,3 and 4-piperidyl, 1-(lower alkyl)-2, and 3-pyrrolidyl, tropinyl and pseudotropinyl; and non-toxic acid-addition salts of the basic esters.

2. The 3-diethylaminopropyl ester of 10,11-dihydro-5H-dibenzo[a,d]cyclohepten-5-yl carboxylic acid.

3. A non-toxic acid addition salt of the compound of claim 2.

4. The tropinylester of 10,11-dihydro-5H-dibenzo[a,d] cyclohepten-5-yl carboxylic acid.

5. A non-toxic acid-addition salt of the compound of claim 4.

6. The 1-methylpiperidin-4-yl ester of 10,11-dihydro-5H-dibenzo[a,d]cyclohepten-5-yl carboxylic acid.

7. A non-toxic acid-addition salt of the compound of claim 6.

References Cited by the Examiner

UNITED STATES PATENTS

| 3,049,438 | 8/1962 | Buell et al. | 117—33.5 |
| 3,058,989 | 10/1962 | Buell et al. | 260—296 |
| 3,222,371 | 12/1965 | Buell et al. | 260—294.8 |

WALTER A. MODANCE, *Primary Examiner.*

ALAN ROTMAN, *Assistant Examiner.*